C. H. BAYER.
APPARATUS FOR CONTAINING AND CONSUMING FUEL.
APPLICATION FILED SEPT. 21, 1917.

1,277,362.

Patented Sept. 3, 1918.

Charles H. Bayer INVENTOR

BY Henry M. Bingham
his ATTORNEY

UNITED STATES PATENT OFFICE.

CHARLES H. BAYER, OF GREAT NECK, NEW YORK.

APPARATUS FOR CONTAINING AND CONSUMING FUEL.

1,277,362.    Specification of Letters Patent.    Patented Sept. 3, 1918.

Application filed September 21, 1917. Serial No. 192,446.

*To all whom it may concern:*

Be it known that I, CHARLES H. BAYER, a citizen of the United States, and a resident of Great Neck, in the county of Nassau and State of New York, have invented certain new and useful Improvements in Apparatus for Containing and Consuming Fuel, of which the following is a specification.

The objects of my invention are to produce a container in which fuel may be stored, to which supporting legs may be attached and detached, in which the fuel may be burned, and by which the dish or other object to be heated may be supported.

These and the other objects of my invention will be more fully set forth in the following specification and claims.

Figure 1:
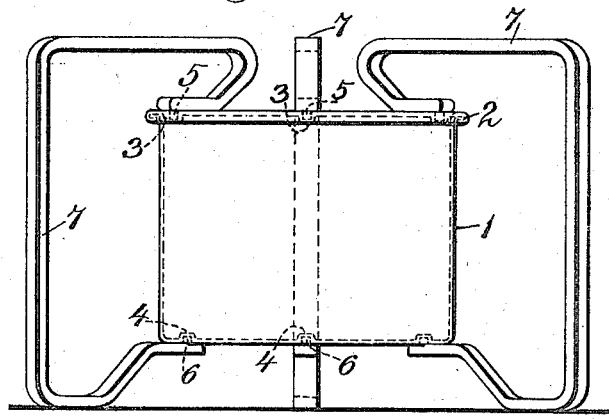
Figure 2:
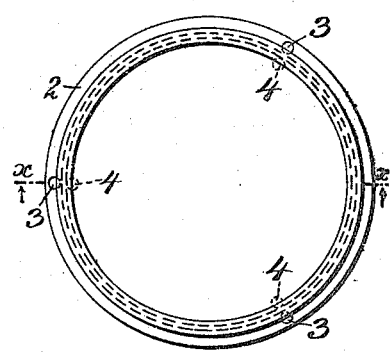
Figure 3:
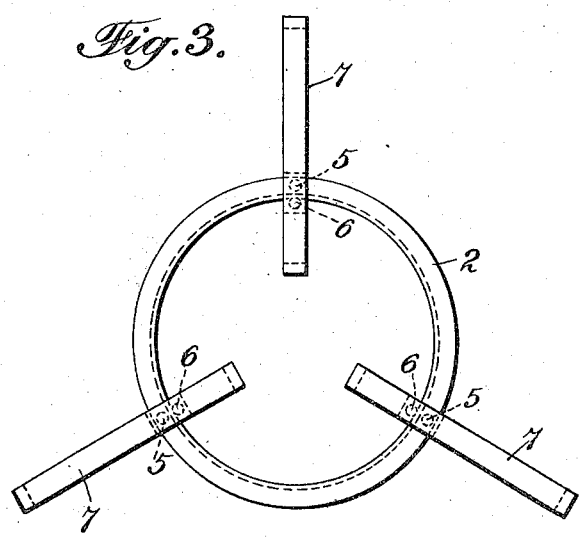
Figure 4:
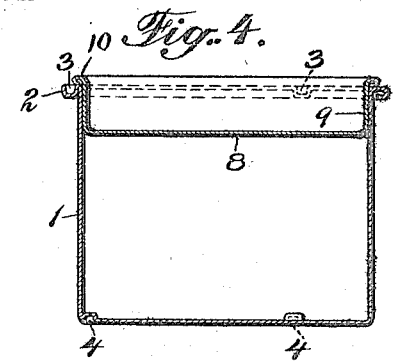
Figure 5:
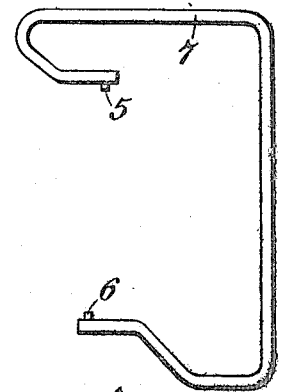

In the accompanying drawings, Figure 1 is an elevation of my invention. Fig. 2 is a plan view with the supporting legs detached. Fig. 3 is a plan view with the legs attached. Fig. 4 is a sectional view on the line $x$—$x$ of Fig. 2. Fig. 5 is an elevation of one of the supporting legs.

Similar numerals refer to similar parts throughout the accompanying drawings.

My invention as shown in the accompanying drawings consists of a container 1 the upper portion of which is provided with a lip 2 in which are formed recesses 3. Recesses 4 are formed in the bottom of the container. These recesses 3 and 4 are adapted to receive pins 5 and 6 formed on the resilient supporting legs 7, which are preferably three in number. The legs 7 being resilient the ends may be sprung outward and when released will clamp the bottom and top of the container and retain the pins in the recesses. The container is provided with a cover 8 which is removably secured by frictional contact in the upper end of the container 1. The cover 8 is provided with a cylindrical circumferential wall 9 and an outwardly turned flange 10 and when in position as shown in Fig. 4, the outer surface of the wall 9 is in frictional contact with the inner surface of the side wall of the container 1.

The operating of the device is as follows:—

The cover 8 is removed, the supporting legs are attached, and the fuel in the container ignited. The dish or other object to be heated is then placed on the legs 7, where it is supported at the proper distance above the container to insure complete combustion of the gases generated from the fuel and be subjected to the direct action of the flame. It will be noted that the supporting legs may be removed or folded in toward the container when it is not in use, or to economize space when the device is packed for shipment, and that the fuel which is in the form of a cylindrical body of approximately the same diameter as the container may be readily inserted into the container and when so inserted will completely fill it.

I claim:—

1. Apparatus for containing and consuming fuel comprising a cylindrical fuel container, an outwardly turned flange formed from the upper portion of the side wall of the container, recesses in the flange, recesses in the bottom of the container, removable resilient legs provided with pins adapted to be sprung into said recesses and support the container in an elevated position and to form a support for the dish or other object to be heated above the container, and a removable cover adapted to be held in the upper end of the container by frictional contact.

2. Apparatus for containing and consuming fuel comprising in combination a cylindrical fuel container, provided with a removable cover, resilient legs adapted to clamp the bottom and top of the container and support the container in an elevated position and the object to be heated in an elevated position above the container.

3. Apparatus for containing and consuming fuel, comprising in combination a cylindrical fuel container provided with a removable cover, removable resilient legs, the ends of which are formed to clamp the container and bear against the bottom thereof and support the container in an elevated position and the object to be heated in an elevated position above the container.

Signed at New York city, in the county of New York and State of New Yorw, this 14th day of September, 1917.

CH. H. BAYER.

Witnesses:
 B. K. WEST,
 HOWARD BEATTY.

*Copies of this patent may be obtained for five cents each, by addressing the "Commissioner of Patents, Washington, D. C."*